United States Patent Office 3,707,550
Patented Dec. 26, 1972

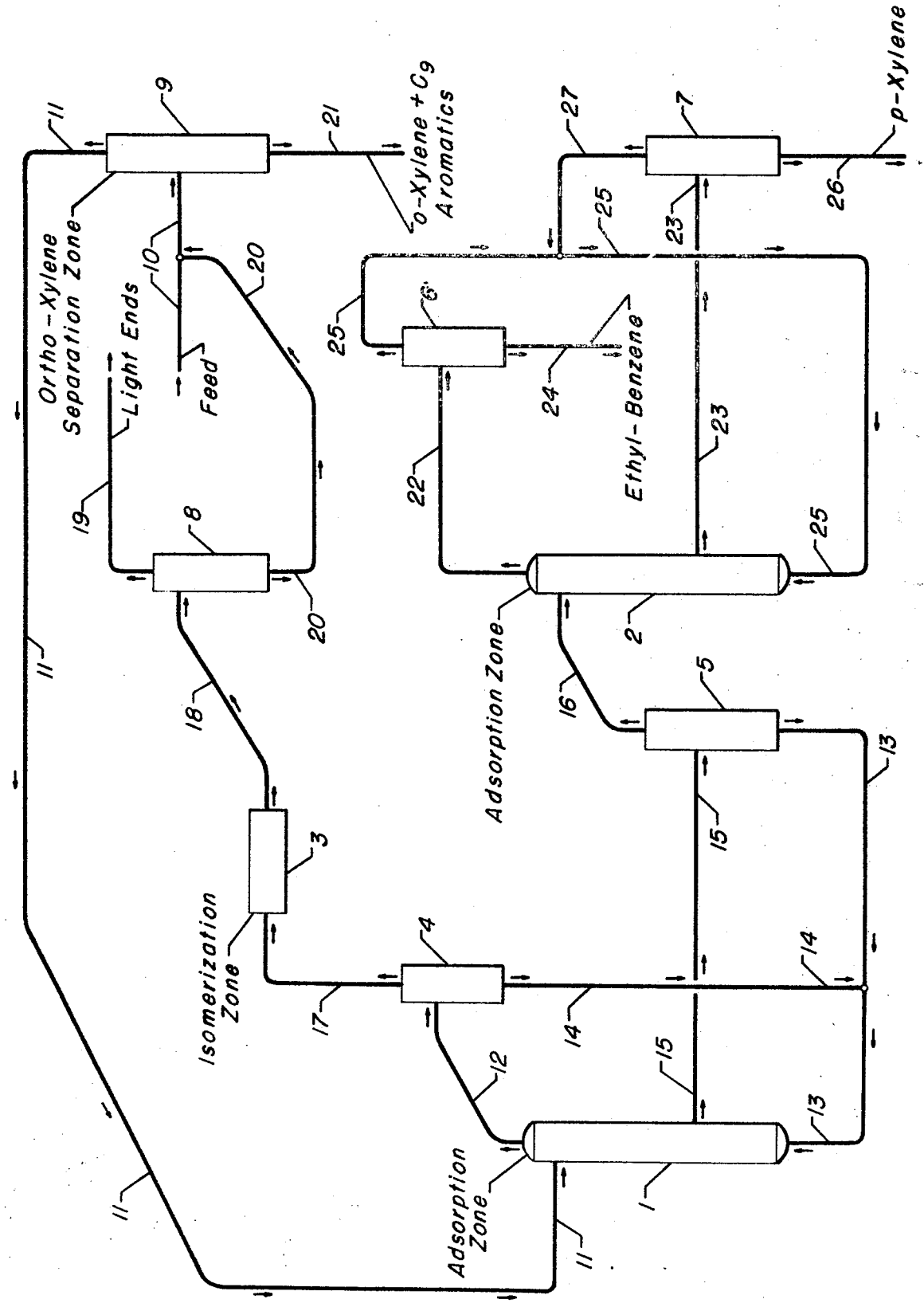

3,707,550
PROCESS FOR THE PRODUCTION AND RECOVERY OF ORTHO-XYLENE, PARA-XYLENE AND ETHYLBENZENE
Laurence O. Stine, Western Springs, and Donald B. Broughton, Evanston, Ill., assignors to Universal Oil Products Company, Des Plaines, Ill.
Continuation-in-part of application Ser. No. 874,919, Nov. 7, 1969, now Patent No. 3,636,121. This application Oct. 26, 1971, Ser. No. 191,976
Int. Cl. C07c 7/12, 15/08
U.S. Cl. 260—674 SA
9 Claims

ABSTRACT OF THE DISCLOSURE

A modified dual adsorption and isomerization process employing a combination of an ortho-xylene separation zone and a first adsorption zone in communication with a second adsorption zone and an isomerization zone. The process is suitable for the separation of various $C_8$ aromatic isomers into individual relatively pure streams containing the individual isomers. The ortho-xylene separation zone separates ortho-xylene from the other $C_8$ aromatic isomers contained in the fresh feed and recycle feed and passes the remaining $C_8$ aromatic isomers to a first adsorption zone. The first adsorption zone then separates para-xylene and ethylbenzene from meta-xylene and passes the para-xylene and ethylbenzene to a second adsorption zone wherein para-xylene and ethylbenzene are separated into relatively purified para-xylene and ethylbenzene streams. The remaining meta-xylene separated from the para-xylene in the first adsorption zone is passed into an isomerization zone to effect the production of additional $C_8$ aromatic isomers which are recycled to and sequentially separated by the ortho-xylene separation zone and the first and second adsorption zones, allowing increased yields of some of the $C_8$ aromatics based on fresh feed to the ortho-xylene zone. The modification basically comprises separating and removing ortho-xylene from the feed to the isomerization zone thus allowing the production of additional ortho-xylene in said zone and thereby resulting in a higher overall yield of ortho-xylene based on fresh feed than that resulting if ortho-xylene were not separated and removed.

CROSS REFERENCE TO RELATED APPLICATIONS

This application is a continuation-in-part application of copending application Ser. No. 874,919 filed Nov. 7, 1969, now Pat. No. 3,636,121; all the teachings of said copending application are incorporated herein by specific reference thereto.

BACKGROUND OF THE INVENTION

Field of the invention

This invention relates to a process for the selective adsorption of certain $C_8$ aromatic isomers to produce individually concentrated streams of the individual $C_8$ aromatic isomers while isomerizing a portion of the $C_8$ aromatic stream to effect the additional production of a given $C_8$ aromatic isomer. More specifically, this invention pertains to a combination process employing an ortho-xylene separation zone, two adsorption zones, and an isomerization zone to effectively separate a $C_8$ aromatic feed stream into concentrated streams of ortho-xylene, para-xylene and ethylbenzene. The ortho-xylene separation zone effects the separation of ortho-xylene from the other $C_8$ aromatic isomers, the two adsorption zones effect the separation of para-xylene from the ethylbenzene while the isomerization zone allows either the additional production of ethylbenzene, para-xylene or ortho-xylene depending on the products desired.

DESCRIPTION OF THE PRIOR ART

It is known in the art that certain crystalline aluminosilicates can be used to selectively separate one type or class of hydrocarbons from another. Specifically, the separation of $C_8$ aromatic isomers can be effected employing various types of crystalline aluminosilicates to selectively adsorb a given $C_8$ aromatic isomer, thereby allowing recovery of a desired $C_8$ aromatic isomer by using a selected adsorbent. However, it has not been recognized in the art that a combination of an ortho-xylene separation zone and adsorption zones together with a particular type isomerization reaction zone can be utilized in a given combination to effectively produce streams containing individual $C_8$ aromatic isomers in relatively pure form. The particular inventive concept disclosed herein employs an ortho-xylene separation zone and two adsorption zones which selectively separate certain $C_8$ aromatics and which allow a non-retained component of a $C_8$ aromatic stream to be isomerized in a particular manner to form additional valuable $C_8$ aromatic products. Additionally, the combination process of this invention allows the individual adsorption zones to be operated in the specific manner which allows particular desorbents to be used in the individual adsorption zones which are extremely well suited for the individual separation being effected in the individual adsorption zones and allows the adjustment of isomerization conditions to effect additional production of a desired $C_8$ aromatic isomer.

SUMMARY

It is an object of the present invention to present a combination process for the production of enriched streams containing ortho-xylene, para-xylene and ethylbenzene. More particularly, it is an object of the present combination invention to allow the ortho-xylene separation zone to separate ortho-xylene from the $C_8$ aromatic feed and to allow the dual adsorptive separation operation to effect the separation of a portion of the remaining $C_8$ aromatics into individual isomer components while isomerizing other $C_8$ aromatic products to provide desired quantities of para-xylene, ethylbenzene and ortho-xylene. These and other objects of the present invention will come to light in view of the following description of the invention.

The ortho-xylene separation zone employed in the combination process of this invention effects the separation of ortho-xylene from the various other $C_8$ aromatic isomers which comprise para-xylene, meta-xylene and ethylbenzene. This separation zone may be separation means such as distillation columns of packed or tray design, or crystallizers may be used. The ortho-xylene may be contained in either the fresh feed or the recycle feed to the ortho-xylene separation zone or both.

The various adsorption zones employed in the combination process of this invention effect the separation of the remaining $C_8$ aromatic isomers which comprise para-xylene, meta-xylene, and ethylbenzene. We have found that separation of the various $C_8$ isomers can be effected through the use of a crystalline aluminosilicate faujasite structured adsorbent. Common faujasite structured materials which can effectively separate the xylene isomers are the natural and synthetically-prepared Type X and Type Y structured zeolites which contain selected cations at the exchangeable cationic sites within the zeolite crystalline structure.

Both the natural and synthetic aluminosilicates may be used as adsorbents in the present invention. The crystalline zeolitic aluminosilicates encompassed by the present invention for use as an adsorbent in either or both of the adsorbent zones includes aluminosilicate cage structures in which the alumina and silica tetrahedra are intimately connected with each other in an open three-dimensional crystalline network. The tetrahedra are cross-linked by the sharing of oxygen atoms. The spaces between the tetrahedra are occupied by water molecules prior to dehydration. Subsequent partial or total dehydration results in crystals interlaced with channels of molecular dimensions. Thus, the crystalline aluminosilicates are often referred to as molecular sieves. In the hydrated form, the crystalline aluminosilicates may be represented by the general formula presented in Equation 1 below, $$M_{2/n}O:Al_2O_3:wSiO_2:yH_2O \quad (1)$$

where M is a cation which balances the electrovalence of the tetrahedra, $n$ represents the valence of the cation, $w$ represents the moles of $SiO_2$, and $y$ the moles of water.

The zeolite Type X can be represented in terms of the mole ratios of oxides as represented in the following Equation 2 below, $$0.9 \pm 0.2 M_{2/n}O:Al_2O_3:m2.5 \pm 0.5SiO_2:yH_2O \quad (2)$$

where M represents at least one cation having the valence of not more than 3, $n$ represents the valence of M, and $y$ is any value up to about 9, depending upon the identity of M and the degree of hydration of the crystalline. Zeolite X is described in U.S. Pat. No. 2,882,244.

The Type Y zeolite may be represented in terms of the mole ratios of oxides as represented in the following Equation 3, $$0.9 \pm 0.2 M_{2/n}O:Al_2O_3:wSiO_2:yH_2O \quad (3)$$

where $w$ is greater than about 3 and $y$ is any value up to about 9, where M is a cation which balances the electrovalence of a tetrahedra, and $n$ represents the valence of the cation.

The exchangeable cationic sites for both the Type X and Type Y structured zeolite, in general, can be defined as represented in Equations 2 and 3 above as M. Cation exchange or basic exchange methods as generally known to those familiar with the field of crystalline aluminosilicate production are generally performed by contacting the zeolite with an aqueous solution of soluble salts of the cation or cations desired to be exchanged onto the sieve. The degree of cation exchange is allowed to take place before the sieves are removed from the aqueous solutions, washed and then dried to a desired water content. It is contemplated that in cation exchange operations, one or more cations may be placed on the zeolite.

In this specification the terms Type X or Type Y structured zeolites or faujasite-structured materials refer to those structures having a framework consisting of a tetrahedral arrangement of truncated octahedra, for example, the octahedra adjoined at the octahedral faces by hexagonal prisms. The centers of the truncated octahedra occupy the same relative positions as the carbon atoms in diamond. The void spaces located within the faujasite or Type X or Type Y structured zeolites generally consist of elliptical shaped cavities approximately 13 angstroms in length, entered by apertures of distorted chair-shaped 12 member rings which have a free diameter of about 8 angstroms. The gross impression of this structure is that of a densely packed structure of oxygen atoms which surrounds a relatively large interstitial void. In this specification, the faujasite or Type X or Type Y structured materials shall include both the natural occurring minerals and their synthetically-prepared counterparts containing selected cations and specifically includes the various forms of the Type X and Type Y zeolites.

The cations or pairs of cations or mixtures of pairs and single cations which can be used in the adsorption zones of the process of this invention include metals or cations selected from potassium, rubidium, cesium, lithium, sodium, copper, silver, nickel, manganese, cadmium, the Group II–A metals and the pairs selected from barium and potassium, beryllium and potassium, magnesium and potassium, rubidium and potassium, copper and potassium, cesium and potassium, rubidium and barium, cesium and barium, potassium and barium, copper and silver, zinc and silver, copper and cadmium, rubidium and strontium and copper and potassium. Various mixtures of the individual list of single metals or pairs thereof can be used on the adsorbents for use in either adsorption zone provided the particular metal or cation or combination of both which is present within the Type X or Type Y structured zeolite is selected so that the $C_8$ isomer separation which is required takes place.

The isomerization zone employed in the combination process of this invention contains catalysts selected for their abilities to isomerize the meta-xylene stream from the first adsorption zone into various quantities of para-xylene, ethylbenzene, and ortho-xylene. This ability to employ an isomerization zone which, when through process manipulation or catalyst substitution, or both, allows production of various quantities of para-xylene, ethylbenzene, and ortho-xylene according to the varying needs of para-xylene, ethylbenzene and ortho-xylene.

Typical catalysts which are used in normal isomerization reaction zones include inorganic refractory oxides containing platinum group metals and and generally also containing a quantity of a halide. Specific isomerization catalysts include platinum group metals on alumina which also contains various quantities of fluorine, chlorine or bromine. In instances where it is desired not to produce ethylbenzene in the isomerization zone, that is, to convert a portion of the ortho-xylene and meta-xylene passed through the isomerization zone to para-xylene, one uses a catalyst containing palladium and chlorine on alumina. Additional isomerization catalysts of this character include palladium and a halide on alumina which also contains a small quantity of a crystalline aluminosilicate. Other type isomerization catalysts which may be employed for ethylbenzene production at the expense of para-xylene and meta-xylene products are platinum and chlorine on alumina. In many instances, the isomerization catalysts contain two or more different species of halides present on the base of a catalyst to allow the varied reaction to take place. A particularly preferred catalyst to be used in the isomerization zone where it is desired to enhance para-xylene production and ortho-xylene production which requires that the isomerization reaction not produce ethylbenzene is a catalyst containing approximately 0.75 wt. percent palladium and approximately 0.9% chlorine on an alumina base which base contains approximately 3 to 5% of a crystalline aluminosilicate selected from the mordenite species. In cases where ethylbenzene production at the expense of the production of para-xylene and meta-xylene is desired, the isomerization catalyst can generally comprise about 0.375 wt. percent platinum and from about 1 to about 3 wt. percent fluorine and from about 0.1 to about 1.0 wt. percent chlorine.

The adsorption zones operating conditions can include temperatures in the range of from about ambient to about 250° C. and pressures generally above atmospheric and in most instances within the range of from about atmospheric to about 1,500 p.s.i.g. In instances in which a desorption is effected by using a liquid desorbent, it is generally performed in liquid phase operations. In other instances in which vapor operations or combination liquid or vapor operations are effected, adsorption can be effected in the liquid phase and desorption in the vapor phase. Of course, during these type operations in which different phases effect the adsorption and desorption operations, there may be temperature differences during the adsorption cycle and the desorption cycle or pressure differences between the two adsorption and desorption cycles or both temperature and pressure differences for both adsorption and desorption cycles. In some instances, desorption can be effected by using a gaseous hydrocarbon or other material at elevated temperature and reduced pressure or either one individually to effect desorption of the preferentially retained aromatic hydrocarbons on the adsorbents in the individual adsorption zones.

The overall operations effected in either or both adsorption zones can be performed by typical swing-bed type operations or by employing the simulated moving-bed countercurrent flow operations. It is well known to those skilled in the separation art that manifold systems can be incorporated, where swing-bed operations are to be used, to allow continuous production of extract and raffinate streams by manipulating the input and output streams to the individual adsorption beds to effect continuous adsorption and desorption steps. The simulated moving-bed countercurrent flow operations are typically performed through the use of a series of inlet and outlet lines connected to an elongated bed of adsorbent which lines are advanced in the direction of the general fluid flow through the fixed-bed by using a particular type of a rotating valve which allows the various operations to take effect simultaneously at different areas of the fixed-bed. When observing the operations from a certain location within the adsorption bed, adsorption and desorption cycles are seen in a repetitive manner and in a way which allows the efficient production of the desired extract and raffinate streams. The overall countercurrent fixed-bed simulated moving-bed type operations are generally demonstrated in U.S. Pat. No. 2,985,589. The operations of the process of this invention, however, are similar in some ways to the operations disclosed in the reference patent.

The isomerization zone operating conditions are determined by a particular product distribution which is desired in the effluent stream from that zone. Typically, isomerization reaction zone operations include temperatures within the range of from about 200° C. to about 450° C., pressures of from about atmospheric to about 100 atmospheres, liquid hourly space velocities based on fresh feed passed into the reaction zone of from about 0.1 to about 20 and hydrogen to hydrocarbon feed molal ratios of from about 1 to about 20. Additionally, in some instances, to control or maintain catalytic activity, halogen addition to the feed stock to the isomerization reaction zone may be effected. The concentration of halogen and the feed stock can be from about 1 to about 1,000 p.p.m.

DETAILED DESCRIPTION OF THE DRAWING

The attached drawing shows the combination process of this invention which includes an ortho-xylene separation zone and two adsorption zones and an isomerization zone with related separation equipment. The flow scheme showed in the attached drawing is simplified and does not contain valves, pumps, compressors, heat-exchangers or other detailed process equipment. It is assumed that those well versed in the refinery art would logically be able to determine the proper equipment needed in order to effect operation of the dislosed combination process.

The ortho-xylene separation zone 9 effects the separation of ortho-xylene from the other $C_8$ aromatic isomers while adsorption zones 1 and 2 effect the separation of para-xylene and ethylbenzene from the other $C_8$ aromatics and the eventual separation of the para-xylene from the ethylbenzene. Isomerization zone 3 received raffinate or extract material from adsorption zone 1 and effects, depending on the desired product distribution, isomerization of meta-xylene to either additional para-xylene and ortho-xylene without ethylbenzene or to reduced amounts of ortho-xylene and para-xylene with ethylbenzene. Line 10, through which the fresh feed stock to the process of this invention passes, is connected to ortho-xylene separation zone 9. Entering ortho-xylene separation zone 9, the fresh feed stream is mixed with a recycle stream from separation means 8 which passes through line 20. Either the fresh feed stream or the recycle stream or both may contain ortho-xylene. The total feed including recycle material passes through line 10 into ortho-xylene separation zone 9 where there is effected the separation of ortho-xylene and materials boiling at a temperature equal to or greater than ortho-xylene which passes out of the process through line 21 from materials which boil at a temperature below that of ortho-xylene which pass through line 11 which may be directed to adsorption zone 1. A portion of the material may be recovered prior to passage into adsorption zone 1. In adsorption zone 1 the separation of para-xylene and ethylbenzene from the meta-xylene present in the material which passes through line 11 is effected. For the purpose of a specific disclosure, we shall assume that the para-xylene and ethylbenzene are selectively retained by the adsorbent in the adsorbent in the adsorption zone 1. The extract stream from adsorption zone 1 contains para-xylene and ethylbenzene and additionally contains a quantity of desorbent because the para-xylene and ethylbenzene are removed from the adsorbent by a desorbent flush stream which is removed along with the para-xylene and ethylbenzene. The extract stream passes through line 15 into separation means 5 wherein para-xylene and ethylbenzene are separated from the desorbent material which is returned to the adsorption zone 1 via line 13 to be re-used. The para-xylene and ethylbenzene removed from separation means 5 pass through line 16 into adsorption zone 2. The material passing through line 16 contains para-xylene and ethylbenzene. The separation effected in adsorption zone 2 allows the separation of para-xylene from ethylbenzene. The adsorbent contained in adsorption zone 2 may be para-xylene selective or ethylbenzene selective because of the fact that only two $C_8$ aromatic isomers are passed into that bed and an adsorbent having a selectivity for only one of the two is sufficient to properly separate para-xylene and ethylbenzene. For the purpose of a specific disclosure but not necessarily a limiting statement, we shall assume that the material passing through line 23 is an extract stream containing para-xylene and a desorbent material. This limitation requires that the adsorbent be para-xylene selected and that the material passing through line 22 be a raffinate stream comprising the less selectively retained component and desorbent material. Material passing through line 22 passes into separation means 6 which separates ethylbenzene which passes out of process through line 24 from desorbent which passes via line 25 to be re-used in adsorption zone 2. The extract stream passing through line 23 which contains para-xylene and desorbent passes into separation means 7 wherein desorbent is separated from the product para-xylene. The para-xylene is recovered via line 26 while the desorbent material is recycled via line 27 into line 25 to be re-used in the process. Not shown in the drawing for either adsorbent bed are auxiliary desorbent withdrawal or addition lines which in many cases may be needed where the desorbent must be replenished or withdrawn from either or both systems. The material passing out of adsorption zone 1 through line 12 is a raffinate material and contains, in addition to desorbent material, meta-xylene and any other non-retained components present in the feed mixture which may include other aromatic hydrocarbons such as benzene or toluene or paraffinic or naphthenic type materials. These materials pass into separation means 4 where the desorbent material is separated from the raffinate components. The desorbent passes to line 13 to be re-used in the process while the purified meta-xylene material passes through line 17 into isomerization zone 3 where the desired isomerization reactions take place.

The effluent material from isomerization zone 3 passes through line 18 into separation means 8. The effluent material passing through line 18 may vary in composition depending on the operations effecting isomerization and the catalyst used in the isomerization reaction zone. Specifically, the isomerization zone effluent material may contain appreciable quantities of ethylbenzene which is produced at the expense of para-xylene and ortho-xylene or may contain increased quantities of para-xylene and ortho-xylene with no ethylbenzene. The effluent material leaving separation means 8 is separated into a light hydrocarbon stream which comprises toluene, benzene and lighter hydrocarbons which pass out of the process through line 19 and the $C_8$ aromatics and heavier materials which pass out of separation means 8 via line 20 and into said ortho-xylene separation zone 9.

The essential flow as described above is necessary to effect proper operations of the combination process. However, separating means located between and on various lines contained in the drawing may be separation methods such as distillation columns of tray or packed design or crystallizers may be utilized.

The para-xylene, ethylbenzene and ortho-xylene streams which pass out of the process may be further processed or collected as individually enriched streams of the individually named products depending on the use intended for each.

In adsorptive-separation processes, an important factor that is used to determine the ability of a particular adsorbent to separate components of a feed mixture is the selectivity of the adsorbent for one component when compared to another component. The selectivity (B) as used throughout this specification is defined as the ratio of two particular components of an adsorbed phase over the ratio of the same two components of the unadsorbed phase at equilibrium conditions and is generally expressed in equation form as shown in Equation 4 below, $$\text{Selectivity} = B_{x/y} = \frac{\frac{x}{y}a}{\frac{x}{y}u} \quad (4)$$

where B represents the selectivity, $x$ and $y$ represent the individual components being compared, $a$ represents the material adsorbed or retained by the adsorbent and $u$ represents the external phase or the material which is sitting in the interstitial voids located between individual particles of adsorbent. The selectivity is measured at what are referred to as equilibrium conditions, such conditions occurring when the feed which was passed over a bed of adsorbent did not change in composition after contacting the bed of adsorbent, or in other words, there was no net transfer of material occurring between the unadsorbed external phase and the adsorbed phase when the selectivity of the two selected components was measured.

As can be seen where the selectivity of the two components approaches unity, there is no preferential adsorption of either component by the adsorbent. As the absolute value of the selectivity becomes greater than unity, there is a preferential selectivity by the adsorbent of one component. When comparing selectivity of component $x$ over component $y$, a selectivity larger than unity indicates preferential adsorption of component $x$ within the adsorbent when compared to component $y$, while a selectivity of less than unity would indicate that component $y$ is preferentially adsorbed when compared to component $x$.

In testing various adsorbents, the selectivity as defined previously in Equation 4 was determined using apparatus and procedures generally described below. The apparatus used to measure the selectivity of a particular adsorbent consisted of a chamber of approximately 40 cc. volume having inlet and outlet ports at opposite ends of the chamber. The chamber was contained within a temperature control heating means and, in addition, pressure control equipment was used to operate the chamber at a constant predetermined pressure. Attached to the outlet line connected to the outlet of the chamber was a gas chromatograph which was used to periodically analyze a portion of the effluent stream leaving the adsorbent chamber during adsorption and desorption operations. A feed mixture having a known composition was passed through the adsorbent chamber at a regulated pressure and temperatre until the effluent composition flowing from the adsorbent chamber remained at a constant composition indicating that there was no net transfer between the adsorbed phase within the adsorbent and the unadsorbed or external phase surrounding the adsorbent particles. A second mixture containing a hydrocarbon which was able to desorb the previously adsorbed components of the feed from the adsorbent was then passed through the adsorbent chamber. The gas chromatograph was used to monitor the unadsorbed or external phase and the material desorbed from within the adsorbent. Knowing the composition of these two streams and their respective flow rates, a selectivity for various components in the feed stream could be determined.

The feed stream which was used to measure the selectivities of various adsorbents used in the various adsorption zones consisted of equal quantities (8 and ⅓ vol. percent each) of ethylbenzene, para-xylene and meta-xylene mixed with 2,2,4-trimethylpentane rendering a feed mixture containing 75 vol. percent paraffinic material and 25 vol. percent $C_8$ aromatic isomer material. The $C_8$ aromatic isomers were diluted with the paraffin material to facilitate ease of analyzing the adsorbed and unadsorbed phases for the selectivity determination. Ortho-xylene was excluded, since its presence would have complicated the analytical procedures, although previous experience indicated that the ortho-xylene isomer behaves substantially the same as the meta-xylene isomer. The desorbent material consisted of 25 vol. percent toluene, 74 vol. percent 2,2,4-trimethylpentane and 1 vol. percent neohexane which was used as a tracer to determine desorbent breakthrough in the effluent stream leaving the adsorbent chamber. The adsorption and desorption cycles were performed in the vapor phase at about 260° C. and slightly above atmospheric pressure.

The following examples and illustrative embodiments more specifically show the various adsorbents and catalysts which can be used in the various units for the process of this invention and are not to be construed as undue limitations on the claimed invention.

EXAMPLE I

In this example, various adsorbents were tested using the testing procedure as described previously to determine the capacity and selectivity of the various adsorbents for the individual $C_8$ aromatic isomers. The two basic starting materials used in the production of the various adsorbents tested in this example were the Type X or Type Y zeolites. The adsorbents as indicated in the following table contained various single cations or combination of two cations present within the zeolite and were essentially totally ion-exchanged, that is, most of the cationic sites within the Type X or Type Y zeolite contained the indicated cation. An arbitrary cationic exchange procedure is described below.

A chromatographic-type exchange column was used to perform the cation exchange. The total number of cation equivalents used to exchange the original sodium form of the Type X or Type Y zeolite was three times the total equivalents of sodium present in the zeolite. The volume of solution containing the cations was six times the volume of the Type X or Type Y starting material with the cation solution flow rate at approximately 80 to 100 ml. per hour passing through the zeolite. Whenever two cations were used to simultaneously exchange the sodium in the original Type X or Type Y zeolite, the total number of equivalents of each cation used was halved; all other conditions remained equal. After the cation exchange procedure had been completed, the adsorbent was water-washed, air-equilibrated and finally treated with air in a muffle furnace at about 550° C. After heating, the sieves were cooled in an inert atmosphere containing no water and then used in the adsorbent chamber as previously described. The table below shows the capacity of the sieve for the various $C_8$ aromatic isomers represented by the milliliters of the particular $C_8$ aromatic isomer adsorbed per 40 ml. of sieve in the adsorbent chamber. The selectivities were determined using Equation 4 above and are represented for determining the selectivities of the combinations of para-xylene and ethylbenzene, para-xylene and meta-xylene, meta-xylene and ethylbenzene.

toluene. It is for this reason that the preferred desorbent to be used in the first adsorption zone is a material boiling at a higher temperature than the $C_8$ aromatics. This allows the desorbent which is present in a raffinate stream to be easily fractionated from both the $C_8$ aromatics present in the raffinate and the non-aromatic materials also present. The non-aromatic materials are preferably separated and recovered for further processing as a relatively

| Adsorbent | Zeolite type | Cation(s) on sieve | Capacity, ml./40 ml. sieve | | | | Selectivity, B | | |
|---|---|---|---|---|---|---|---|---|---|
|   |   |   | P | M | E | E | p/e | p/m | m/e |
| A | Y | Li | 1.74 | 2.43 | 1.14 | 5.31 | 1.52 | 0.72 | 2.13 |
| B | Y | Na | 1.69 | 2.23 | 1.28 | 5.20 | 1.32 | 0.75 | 1.74 |
| C | Y | K | 2.05 | 1.12 | 1.76 | 4.93 | 1.16 | 1.83 | 0.64 |
| D | Y | Rb | 1.84 | 1.22 | 1.92 | 4.98 | 1.51 | 0.96 | 0.64 |
| E | Y | Cs | 1.38 | 0.92 | 1.73 | 4.03 | 1.50 | 0.80 | 0.53 |
| F | Y | Be | 0.84 | 0.93 | 0.78 | 2.55 | 1.08 | 0.91 | 1.19 |
| G | Y | Mg | 1.55 | 2.65 | 0.93 | 5.13 | 1.67 | 0.59 | 2.85 |
| H | Y | Ca | 1.01 | 2.86 | 0.86 | 4.73 | 1.17 | 0.35 | 3.32 |
| I | Y | Sr | 1.12 | 2.56 | 0.80 | 4.48 | 1.40 | 0.44 | 3.20 |
| J | Y | Ba | 1.51 | 1.19 | 0.82 | 3.52 | 1.85 | 1.27 | 1.45 |
| K | Y | K-Ba | 2.70 | 0.72 | 1.29 | 4.71 | 2.10 | 3.76 | 0.56 |
| L | Y | K-Be | 2.24 | 1.06 | 1.55 | 4.85 | 1.44 | 2.11 | 0.68 |
| M | Y | K-Mg | 2.16 | 0.96 | 1.54 | 4.66 | 1.41 | 2.25 | 0.62 |
| N | Y | K-Rb | 1.70 | 0.94 | 1.60 | 4.24 | 1.06 | 1.80 | 0.59 |
| O | Y | K-Cs | 1.72 | 0.97 | 1.67 | 4.37 | 1.03 | 1.79 | 0.58 |
| P | Y | Rb-Ba | 2.03 | 0.99 | 1.44 | 4.46 | 1.41 | 2.05 | 0.69 |
| Q | Y | Cs-Ba | 1.26 | 1.18 | 1.43 | 4.47 | 1.30 | 1.57 | 0.82 |
| R | X | Na | 1.50 | 1.48 | 1.30 | 4.28 | 1.15 | 1.02 | 1.14 |
| S | X | Ba-K | 2.47 | 0.99 | 1.22 | 4.68 | 2.03 | 2.49 | 0.81 |
| T | X | Ag | 1.63 | 1.53 | 1.18 | 4.34 | 1.38 | 1.07 | 1.30 |
| U | Y | Mn | 1.14 | 1.74 | 0.91 | 3.79 | 1.25 | 0.66 | 1.91 |
| V | Y | Cd | 1.13 | 1.84 | 0.94 | 3.91 | 1.19 | 0.61 | 1.96 |
| W | Y | Cu-Cd | 1.18 | 2.18 | 0.98 | 4.34 | 1.20 | 0.54 | 2.22 |
| X | Y | Cu-Ag | 1.67 | 2.65 | 1.06 | 5.38 | 1.58 | 0.63 | 2.50 |
| Y | Y | Zn-Ag | 2.33 | 2.63 | 1.46 | 6.42 | 1.59 | 0.89 | 1.80 |
| Z | Y | Cu | 1.33 | 2.14 | 0.91 | 4.32 | 1.46 | 0.62 | 2.36 |
| AA | Y | Cu-K | 1.90 | 1.15 | 1.60 | 4.65 | 1.19 | 1.65 | 0.72 |

As can be seen from the table, the particular adsorbents which can be used in the first adsorption zone to separate meta-xylene from para-xylene and ethylbenzene include adsorbents A, B, F, G, H, I, U, V, W, X, Y and Z where the meta-xylene is the selectively adsorbed $C_8$ aromatic, while sieves C, K, L, M, N, O, P, Q, S and AA can be used where para-xylene and ethylbenzene are selectively retained by the sieve with the meta-xylene being the raffinate material. Either one of these sets or mixtures of these sets may be used in the first adsorption zone. The basic consideration is whether in the operation of this particular adsorption zone, it is required that meta-xylene be either the extract material or the raffinate material with the adsorbent selection based on that determination.

In adsorption zone 2, all of the adsorbents shown in the table can be used and when any of the adsorbents from Table 1 is selected to be used in the second adsorption zone, para-xylene is the selectively adsorbed component.

As can be seen, the proper selection of adsorbents in the two adsorption zones will allow the first separation of para-xylene and ethylbenzene from a mixture containing para-xylene, ethylbenzene, and meta-xylene, while the second adsorbent bed effects the separation of para-xylene from ethylbenzene.

Various modes of operation can be effected in adsorption zone 1 by selecting a proper adsorbent from those listed in the table to effectively adsorb either para-xylene and ethylbenzene or meta-xylene. Depending on the adsorbent selection for adsorption zone 1 either a raffinate or extract stream is passed to adsorption zone 2, but in all cases the material flowing to the second adsorption zone contains para-xylene and ethylbenzene. It has been found that in cases where a reformate feed is fed to the process that naphthenes and other materials comprising paraffinic type hydrocarbons are present with the aromatic material fed to the process. The non-aromatic materials, from previous experiments, have been found to not be selectively retained by the adsorbents used in this invention and end up as part of the raffinate material. The non-aromatic materials in the raffinate are in most all cases slightly lower-boiling than the $C_8$ aromatic streams and in many cases boil within the boiling range of benzene or purified non-aromatic stream. In order to prevent the non-aromatic materials from being further passed on to adsorption zone 2, it is preferred to use an adsorbent in adsorption zone 1 which selectively retains para-xylene and ethylbenzene, thereby allowing the raffinate material to be passed, if desired, into the isomerization zone.

The preferred mode of operations of adsorption zone 2 require that material fed to this adsorption zone contain essentially non-aromatic materials. This requires that the first adsorption zone be operated in such a manner as to selectively adsorb para-xylene and ethylbenzene while allowing the non-aromatic portion of the material fed to that adsorption zone plus meta-xylene to be present in a raffinate stream.

It has been found in pilot plant scale testing apparatus that to effect an efficient separation of para-xylene from ethylbenzene that a toluene desorbent is preferred, the toluene is lower boiling than the $C_8$ aromatic isomers and when the feed to the second adsorption zone is an extract material from the first adsorption zone, there are no non-aromatics present in that stream which can reduce the effectiveness of toluene desorbent properties. Also, the toluene can easily be separated from the $C_8$ aromatics by distillation techniques when there are no non-aromatics in the extract and raffinate streams leaving the second adsorption zone. The preferred desorbent material, toluene, which is present in both the raffinate and extract streams leaving adsorption zone 2 is easily separated from the para-xylene and ethylbenzene materials by distillation and because of the aforementioned limitation that non-aromatic materials be absent from feed stocks passed into this zone, there is no interference or contamination of the desorbent by non-aromatic materials forming close to its boiling range. This allows ethylbenzene and para-xylene to be recovered from adsorption zone 2 in a highly purified form.

The following illustrative embodiment presents a specific method of operation describing the overall operations of the combination process of this invention.

ILLUSTRATION

A reformate effluent which contains a relatively high concentration of aromatic hydrocarbons plus some non-aromatic materials comprising paraffinic and naphthenic materials is passed into the ortho-xylene separation zone along with recycle material from a separation means which follows an isomerization zone. The ortho-xylene separation zone is operated in such a manner that the higher boiling components comprising ortho-xylene and $C_9^+$ aromatics are separated from materials boiling at a temperature below that of ortho-xylene and withdrawn as a product stream relatively pure in ortho-xylene. The lower boiling materials comprising meta-xylene or para-xylene or ethylbenzene or various combinations of all are directed to the first adsorption zone.

The first adsorption zone is operated in a manner such that para-xylene and ethylbenzene are the selectively retained components of the feed stock passed into that zone. The extract material from the first adsorption zone contains, in addition to para-xylene and ethylbenzene, a desorbent material preferably diethylbenzene. The diethylbenzene concentration in the extract stream which is passed into a separation means to separate desorbent material from the $C_8$ aromatics is approximately from about 5 to about 50% diethylbenzene. The purified para-xylene and ethylbenzene stream withdrawn from this separation means contains essentially no desorbent material and is passed into a second adsorption zone which contains any one of the adsorbents selected from the above table and which is selective for the retention of para-xylene as compared to ethylbenzene. The extract stream removed from the second adsorption zone contains para-xylene and, as indicated, toluene, which is used as a preferred desorbent. The extract stream is passed into a separation means which separates the para-xylene from the toluene which is re-used in the process. The raffinate stream which comprises ethylbenzene and toluene is withdrawn from the second adsorption zone and is passed into another separation means where ethylbenzene is recovered as a relatively purified product with the toluene being passed back into adsorption zone 2 to be re-used as a desorbent material. The raffinate material from adsorption zone 1 also contains diethylbenzene, which is the preferred desorbent for that zone's operations and is passed into a separation means where meta-xylene and any non-aromatics are essentially separated from the diethylbenzene, which is recycled for re-use as desorbent. The meta-xylene and non-aromatic hydrocarbons are passed into an isomerization zone where isomerization takes place to the extent and in a manner dictated by the required product distribution. The effluent material from the isomerization zone passes into a separation means where materials boiling at a lower temperature than the $C_8$ aromatics, generally the non-aromatic hydrocarbons comprising cracked paraffins, and benzene and toluene either from products of side reaction or present originally in the feed passed into the first adsorbent bed, are separated from the $C_8$ aromatics. The $C_8$ aromatics are then recycled back to the ortho-xylene separation zone for the separation and removal of the previously mentioned product stream relatively rich in ortho-xylene.

As can be seen from the above illustration, the operating conditions in the isomerization zone effect production of various quantities of para-xylene or ethylbenzene. Also, the adsorptive separation zones can be operated in a manner by using different adsorbents to produce, in a desired procedure, para-xylene, ethylbenzene and ortho-xylene rich streams. It is generally considered that, in this invention, the orthoxylene which is present in the fresh feed or the recycle feed or both fed to the ortho-xylene separation zone is not passed into the first adsorption zone but is separated and recovered prior to the passage of hydrocarbons thereto and further, the para-xylene and ethylbenzenes which are present in the feed stock fed to the first adsorption zone are not passed into the isomerization zone but are recovered prior to the passage of hydrocarbons thereto.

PREFERRED EMBODIMENTS

A broad embodiment of the combination process of this invention resides in a combination process wherein two separate adsorptive separation zones are employed to effectively separate relatively purified para-xylene and ethylbenzene streams and to allow the stream concentrated in meta-xylene to be passed into an isomerization zone to be isomerized in a manner in which a maximum desired product distribution is effected with a portion of the effluent stream from said isomerization zone recycled to the adsorptive separation zones to allow additional recovery of purified para-xylene and ethylbenzene products.

Another broad embodiment of the process of this invention resides in effecting isomerization of a stream containing meta-xylene, in combination with two adsorptive separation zones to effectively allow additional production of para-xylene, or ortho-xylene, or ethylbenzene in various additional quantities by the particular mode of operations effected in the isomerization zone and the choice of catalyst used therein.

A specific embodiment of the process of this invention resides in separating and recovering ortho-xylene contained in a fresh feed stream or a recycle stream or both from the various other $C_8$ aromatic isomers, in combination with but prior to the use of the two adsorption zones and the isomerization zone, to effect additional production of ortho-xylene beyond that which would be produced if the ortho-xylene were not so separated and removed.

We claim as our invention:

1. A process for the production and recovery of $C_8$ aromatic isomers, which process comprises the steps of:
    (a) passing a feed mixture containing ortho-xylene and one $C_8$ aromatic selected from the group consisting of meta-xylene, para-xylene, and ethylbenzene, and an isomerization zone effluent hereinafter defined to an ortho-xylene separation zone at conditions to effect the separation of ortho-xylene from the other $C_8$ aromatic isomers;
    (b) recovering ortho-xylene from the ortho-xylene separation zone;
    (c) contacting an ortho-xylene separation zone effluent stream containing meta-xylene, para-xylene and ethylbenzene with a bed of crystalline aluminosilicate adsorbent in a first adsorption zone at conditions to effect the selective retention of para-xylene and ethylbenzene by said adsorbent;
    (d) passing at least a portion of the non-retained components of said feed mixture characterized as raffinate material which contains meta-xylene to an isomerization reaction zone at isomerization conditions to effect the conversion of a portion of said non-retained components to at least one $C_8$ aromatic isomer selected from the group consisting of ethylbenzene, para-xylene and ortho-xylene;
    (e) passing at least a portion of an isomerization effluent stream from the isomerization zone to said ortho-xylene separation zone at conditions to effect the separation of ortho-xylene from other $C_8$ aromatic isomers;
    (f) recovering additional ortho-xylene from the ortho-xylene separation zone;
    (g) recycling at least a portion of said ortho-xylene separation zone effluent stream to said first adsorption zone;
    (h) contacting at least a portion of the selectively retained para-xylene and ethylbenzene with a bed of a crystalline aluminosilicate adsorbent in a second adsorption zone at conditions to effect the selective retention of one of said para-xylene and ethylbenzene isomers; and
    (i) recovering from said second adsorption zone enriched para-xylene and ethylbenzene streams.

2. The process of claim 1 further characterized in that said crystalline aluminosilicate adsorbent in said first and second adsorption zones is selected from the group consisting of Type X and Type Y structured zeolites.

3. The process of claim 2 further characterized in that said crystalline aluminosilicate adsorbent in said first adsorption zone contains at least one metal or pair of metals selected from the group consisting of potassium, lithium, sodium, beryllium, magnesium, calcium, strontium, manganese, cadmium, copper, barium and potassium, beryllium and potassium, magnesium and potassium, rubidium and potassium, copper and potassium, rubidium and barium, cesium and barium, copper and silver, zinc and silver, and, copper and cadmium.

4. The process of claim 2 further characterized in that said crystalline aluminosilicate adsorbent in said second adsorption zone contains at least one metal or metal pair selected from the group consisting of the Group II-A metals, the Group I-A metals, copper, silver, manganese, cadmium, cesium and barium, rubidium and barium, potassium and barium, copper and silver, zinc and silver, copper and cadmium, copper and potassium, potassium and beryllium, potassium and magnesium, potassium and rubidium, and, potassium and cesium.

5. The process of claim 1 further characterized in that said selective retention of para-xylene and ethylbenzene by the adsorbent in said first adsorption zone is effected by the steps of:
    (a) contacting said feed mixture with a bed of an adsorbent at conditions to effect the selective retention of para-xylene and ethylbenzene by said adsorbent;
    (b) withdrawing from said bed of adsorbent a raffinate stream made up of non-retained feed components and meta-xylene;
    (c) contacting said bed of adsorbent with a stream containing a first desorbent to effect desorption of any meta-xylene retained within the pores of the adsorbent and thereafter contacting said bed of adsorbent with an increased concentration of a first desorbent at conditions to effect the desorption of para-xylene and ethylbenzene from said adsorbent; and
    (d) recovering from said first adsorption zone a para-xylene and ethylbenzene enriched stream.

6. The process of claim 1 further characterized in that said selectively retained para-xylene and ethylbenzene are separated into an enriched para-xylene stream and an enriched ethylbenzene stream in said second adsorption zone by the steps of:
    (a) contacting said para-xylene and ethylbenzene with a bed of a crystalline aluminosilicate adsorbent in a second adsorption zone at conditions to effect the selective retention of one of said para-xylene and ethylbenzene isomers by said adsorbent;
    (b) withdrawing from said bed of adsorbent a raffinate stream containing a non-retained isomer of said para-xylene and ethylbenzene isomers;
    (c) contacting said bed of adsorbent with a stream containing a second desorbent to effect desorption from said adsorbent of any non-retained isomer present within said adsorbent and thereafter contacting said bed of adsorbent with an increased concentration of a second desorbent at conditions to effect the desorption of said one retained isomer from said adsorbent; and
    (d) recovering from said second adsorption zone a stream enriched in the said retained isomer.

7. The process of claim 6 further characterized in that said retained isomer is para-xylene and said non-retained isomer is ethylbenzene.

8. The process of claim 5 further characterized in that said first desorbent comprises a diethylbenzene.

9. The process of claim 6 further characterized in that said second desorbent comprises toluene.

References Cited
UNITED STATES PATENTS

| | | | |
|---|---|---|---|
| 3,078,318 | 2/1963 | Berger | 260—668 |
| 3,114,782 | 12/1963 | Fleck et al. | 260—674 |
| 3,177,264 | 4/1965 | Buchsbaum et al. | 260—674 |
| 3,126,425 | 3/1964 | Eberly et al. | 260—674 |
| 3,524,895 | 8/1970 | Chen et al. | 260—674 |

PAUL M. COUGHLAN, JR., Primary Examiner

C. E. SPRESSER, JR., Assistant Examiner

U.S. Cl. X.R.

260—668 A